United States Patent [19]

Plöckl

[11] 3,985,451
[45] Oct. 12, 1976

[54] METHOD OF MEASURING THE PITCH ANGLE OF YARNS PROVIDED WITH A TWIST

[75] Inventor: Johann Plöckl, Unterhaching, Germany

[73] Assignee: Erwin Sick Optik-Elektronik, Waldkirch, Germany

[22] Filed: Aug. 20, 1975

[21] Appl. No.: 606,242

[30] Foreign Application Priority Data

Sept. 12, 1974 Germany............................ 2443692

[52] U.S. Cl. .......................... 356/199; 250/237 R; 250/571; 356/138; 356/238
[51] Int. Cl.² ........................................ G01B 11/26
[58] Field of Search .......... 356/119, 200, 237, 238, 356/138; 250/237 R, 559, 562, 571, 572

[56] References Cited
UNITED STATES PATENTS

| 2,824,488 | 2/1958 | Bridges et al. ............ 250/571 |
| 2,991,685 | 7/1961 | Van Dongeren ............ 356/199 |

Primary Examiner—John K. Corbin
Assistant Examiner—Richard A. Rosenberger

[57] ABSTRACT

A method of measuring the pitch angle of yarns provided with a twist, characterized in that an image of the surface of the thread is cast onto a slitted shutter, the slitted shutter and the thread are rotatable relatively to each other about their connecting axis and that the intensity of the light passing through the slitted shutter is measured as a function of the relative angle of rotation between thread and slitted shutter.

15 Claims, 4 Drawing Figures

METHOD OF MEASURING THE PITCH ANGLE OF YARNS PROVIDED WITH A TWIST

This invention relates to a method of measuring the pitch angle of yarns provided with a twist.

As is known, a textured yarn is constituted by a large number of individual fibres which are twisted together. The pitch angle of the individual turns then gives information as to the degree of twist and as to thread density and thickness.

The object of the invention is a method of measuring the pitch angle of the twist of a yarn in a simple manner but nevertheless with a high degree of precision.

In order to fulfil this object, the invention provides, in such a method, that an image of the thread surface is formed on a slitted shutter, that the slitted shutter and the thread are rotatable relatively to each other about their connecting axis and that the intensity of the light passing through the slitted shutter is measured as a function of the relative angle of rotation between thread and slitted shutter. Because the individual fibres, due to their shiny surface, act as raised mirrors (more particularly raised toroidal mirrors) a chain of reflections of narrow extent is formed juxtaposed in the image plane, these reflections being aligned side by side in conformity with the twist angle and the thread thickness. The amount of light passing through the slitted shutter is thus a maximum at the moment when the direction of the slit and of the turns of the yarn are mutually aligned. By measuring the angle of rotation of the shutter, it is thus possible to determine the pitch angle in a simple manner. In order to obtain the said reflections, the thread is preferably illuminated with a parallel beam of light at right angles to its longitudinal extent and in the direction of the optical axis.

A particularly convenient embodiment is characterised by the fact that it is not the thread, but the shutter which is rotated about an axis standing at right angles to it. Furthermore, there is preferably generated from the light passing through the shutter an electrical signal which can then be evaluated electronically in any desired manner.

The shutter is preferably rotated continuously, conveniently at AC mains supply frequency. Alternatively an oscillating movement of the shutter occurring about the axis of rotation may also be provided. In this case, a zero trigger signal is formed in a predetermined angular position, from which the angle up to the maximum electrical signal is measured. By using the mains supply frequency for the synchronisation of the rotation of the slitted shutter, the relevant trigger signal can be obtained in a very simple manner.

A particularly simple mode of evaluation is obtained if the zero trigger signal is formed at the moment when the slit is standing at right angles to the longitudinal direction of the image of the thread cast upon the shutter.

The thread is preferably moved at a constant speed in its longitudinal direction. The number of turns of the yarn travelling past on the slit of the shutter per unit of time is then conveniently much greater, preferably at least ten times as great, as the number of revolutions of the slitted shutter occurring per unit of time. In this manner the reflections from the thread surface moving past the slit generate an alternating voltage signal which is more suitable for evaluation by means of alternating current amplifiers, which is additionally modulated by the rotation of the slitted shutter. The modulation is then evaluated in order to determine the maximum.

The invention also has as its object an apparatus for performing the above mentioned method, in which according to the invention an objective is arranged between the thread and the slitted shutter which is rotatable about an axis passing through the slit. The objective forms an image of the surface of the yarn in the plane of the slitted shutter.

Since it is preferably proposed to measure directly on the texturing machine, it must also be taken into consideration that the thread rotates like a screwthreaded rod. Thus given a suitable tuning of the rotation and longitudinal movement of the thread, the turns appear to be stationary with reference to the shutter, and no modulation occurs. In the case of such a construction, a modulation is preferably caused by the light of the illumination source being periodically interrupted.

For laboratory purposes, the thread may also be arranged on a rotary drum in order to obtain the speed in the longitudinal direction. A beam splitter through which the thread is illuminated at right angles is preferably arranged between the thread and the objective. In this way a perpendicular illumination of the thread in the direction of the optical axis is ensured by simple means.

It is advantageous to arrange behind the slitted shutter a condenser which concentrates the light passing through the slit on to a photo-receiver. The electrical signal formed at the output of the photo-receiver is then passed on for electronic evaluation.

It is particularly advantageous if the width of the slit corresponds substantially to the width of a reflection of a turn of the thread. By this means a particularly pronounced maximum is ensured when alignment occurs of the reflections with the slit.

According to a further advantageous embodiment, the slitted shutter is fixed to a rotary bearing ring which is supported for rotation in a stationary counter bearing ring. The rotary bearing ring is then conveniently driven by a motor.

The invention is further described below by way of example with reference to the accompanying drawing, wherein.

Figure 1:
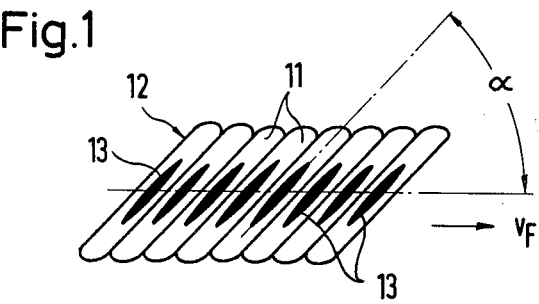
FIG. 1 shows a greatly enlarged schematic plan of a yarn suitable for the measurement according to the invention, comprising individual threads twisted together.

According to FIG. 1, the individual turns of the fibres 11 of a thread 12 exhibit a pitch $\alpha$ with reference to the longitudinal direction $v_F$. Due to the shiny surface peculiar more particularly to plastics yarns, when the thread 12 is illuminated at right angles, according to FIG. 1, reflections 13 are produced. In physical terms, the shiny surfaces of the individual fibres are convex toroidal mirrors. According to FIGS. 2 and 3, an image of the surface of the individual threads, and more particularly of the reflections 13, is cast through an objective 18 onto a slitted shutter 14 which is arranged with its plane parallel to the longitudinal extent of the thread 12 at a suitable distance from the objective 18. The thread 12 is arranged on a thread guide 19 which causes the thread 12 to move with a speed $v_F$ in its longitudinal direction parallel to the slitted shutter 14 in the region of the optical ray path.

The thread 12 is illuminated at right angles from above by a lamp 22 through a condenser 21 and a beam splitting mirror 20. The image forming ray path also passes through the mirror 20.

Figure 2:
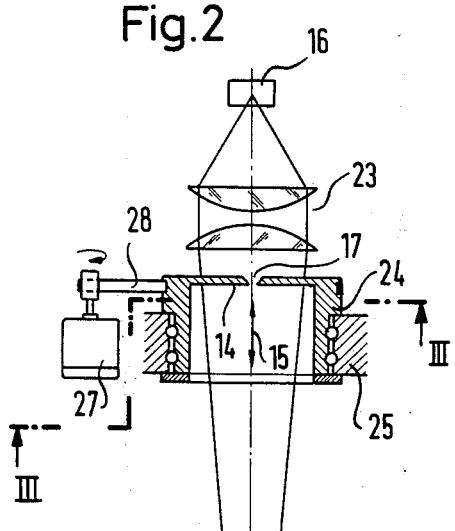
FIG. 2 shows a schematic partly sectioned view of an apparatus according to the invention.
Figure 3:
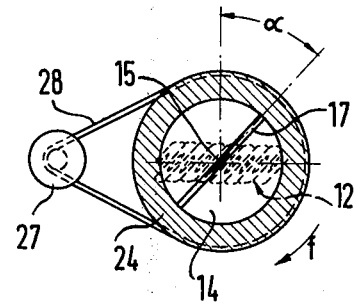
FIG. 3 shows a cross-section along the line III—III in FIG. 2.

According to FIG. 2, the slitted shutter 14 having a slit 17 is arranged in such a way with reference to the optical axis 31 that its axis of rotation 15 passes through the centre of the slit 17 and coincides with the optical axis 31.

The rotary mounting of the slitted shutter 14 is achieved in that its edge is firmly attached to a rotary bearing ring 24 which is in turn mounted rotatably about the axis 15, for example by means of ball bearings indicated, in a counter bearing ring 25 integral with the housing. The drive occurs through a motor 27 by means of a drive belt 28, but the latter, e.g., by the provision of tooth systems, co-operates with the drive wheels in such a way that a precisely synchronous drive of the slitted shutter 14 is possible by the motor 27.

The light passing through the shutter 14 is collected by means of a condenser 23 and is concentrated onto a photo-transducer 16.

Since the individual fibres 11 reflect a considerable proportion of the incident light into the optical ray path, owing to the illumination at right angles, a series of reflections 13 of relatively small extent are produced side by side in the image plane on the slitted shutter 14, as indicated in FIG. 1. The pitch angle $\alpha$ is exactly identical with the angle $\alpha$ of the individual turns with respect to the longitudinal direction (FIG. 1). The width of the individual turns appears slightly greater or slightly smaller in the slitted shutter, according to whether an optical enlargement or reduction takes place.

The width of the slit 17 is conveniently chosen so that it just covers the image of a reflection 13 in width.

Figure 4:
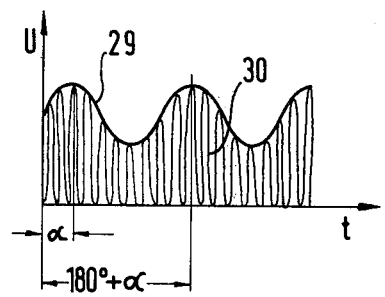
FIG. 4 shows a voltage/time graph of the electrical signal obtained at the output of the photo-receiver of the apparatus according to FIG. 2.

Due to the speed of progress $v_F$ of the thread in its longitudinal direction, an alternating signal, as illustrated by the curve 30 in FIG. 4, appears at the output of the photo-transducer 16. If the slitted shutter 14 is simultaneously set in rotation in the direction of the arrow f in FIG. 3, then the alternating signal 30 in FIG. 4 becomes modulated in conformity with the envelope curve 29.

The maximum of the envelope curve 29 corresponds to the time of alignment of the slit 17 with the reflections 13. The minimum is reached in an angular position of the slit 17 differing from the latter by 90°.

An extremely simple and nevertheless precise measurement of the angle $\alpha$ is rendered possible by the fact that the slitted shutter 14 is driven synchronously with the AC mains supply frequency of e.g., 50 Hz. It is then possible to obtain from the mains frequency in simple manner a zero trigger signal, from which the angular measurement up to the next amplitude maximum occurs electronically. In the graph in FIG. 4, the point of origin of the envelope curve 29 corresponds to the time of the zero trigger signal. After the rotation of the slitted shutter 14 has progressed by the angle $\alpha$, the amplitude maximum is then attained. After $180° + \alpha$ the next maximum is attained. By an electronic evaluation stage connected to the photo-receiver 16, the said angle $\alpha$ up to the maximum, i.e., the pitch angle $\alpha$ of the yarn, can be determined in simple manner.

What is claimed is:

1. Method of measuring the pitch angle of thread provided with a twist, wherein an image of the surface of the thread is cast onto a slitted shutter, the slitted shutter and the thread are rotatable relatively to each other about their connecting axis and the intensity of the light passing through the slitted shutter is measured as a function of the relative angle of rotation between thread and slitted shutter.

2. Method according to claim 1, wherein the shutter is rotated about an axis oriented at right angles to it.

3. Method according to claim 1, wherein an electric signal is formed from the light passing through the shutter.

4. Method according to claim 2, wherein the shutter is rotated continuously.

5. Method according to claim 4, wherein the shutter is rotated at mains supply frequency.

6. Method according to claim 4, wherein in a predetermined angular position, a zero trigger signal is formed from which the angle up to the maximum electrical signal is measured.

7. Method according to claim 6, wherein the zero trigger signal is formed at the moment when the slit is standing at right angles to the longitudinal direction of the image of the thread cast onto the shutter.

8. Method according to claim 4, characterised in that the thread is moved in its longitudinal direction at a constant speed.

9. Method according to claim 8, characterised in that the number of turns travelling past the slit of the shutter per unit of time is at least ten times as great as the number of revolutions of the slitted shutter occurring per unit of time.

10. Apparatus for measuring the pitch angle of thread provided with a twist, wherein an image of the surface of the thread is cast onto a slitted shutter, the slitted shutter and the thread are rotatable relatively to each other about their connecting axis and the intensity of the light passing through the slitted shutter is measured as a function of the relative angle of rotation between thread and slitted shutter, characterised in that an objective is arranged between the thread and the slitted shutter rotatable about an axis passing through the slit.

11. Apparatus according to claim 10, characterised in that a beam splitter, through which the thread is illuminated at right angles, is arranged between the thread and the objective.

12. Apparatus according to claim 10, characterised in that a condenser which concentrates the light passing through the slit onto a photo-receiver is arranged behind the slitted shutter.

13. Apparatus according to claim 10, characterised in that the width of the slit corresponds substantially to the width of a reflection of one turn of the thread.

14. Apparatus according to claim 10, characterised in that the slitted shutter is fixed to a rotary bearing ring which is mounted rotatably in a stationary counter bearing ring.

15. Apparatus according to claim 14, characterised in that the rotary bearing ring is driven by a motor.

* * * * *